US011010399B1

(12) United States Patent
Horesh et al.

(10) Patent No.: US 11,010,399 B1
(45) Date of Patent: May 18, 2021

(54) AUTOMATED DATA SCRAPING

(71) Applicants: Yair Horesh, Kfar Sava (IL); Yehezkal Shraga Resheff, Jerusalem (IL); Meital Iulia Bojan, Haifa (IL); Hadar Kedem, Hod Hasharon (IL)

(72) Inventors: Yair Horesh, Kfar Sava (IL); Yehezkal Shraga Resheff, Jerusalem (IL); Meital Iulia Bojan, Haifa (IL); Hadar Kedem, Hod Hasharon (IL)

(73) Assignee: Intuit Inc., Mountain View, CA (US)

( * ) Notice: Subject to any disclaimer, the term of this patent is extended or adjusted under 35 U.S.C. 154(b) by 272 days.

(21) Appl. No.: 16/203,152

(22) Filed: Nov. 28, 2018

(51) Int. Cl.
*G06F 16/25* (2019.01)
*G06F 16/958* (2019.01)
*G06Q 40/02* (2012.01)
*G06F 16/93* (2019.01)

(52) U.S. Cl.
CPC .......... *G06F 16/258* (2019.01); *G06F 16/254* (2019.01); *G06F 16/93* (2019.01); *G06F 16/986* (2019.01); *G06Q 40/02* (2013.01)

(58) Field of Classification Search
CPC .... G06F 16/258; G06F 16/986; G06F 16/254; G06F 16/93; G06Q 40/02
See application file for complete search history.

(56) References Cited

U.S. PATENT DOCUMENTS

| 8,090,678 B1* | 1/2012 | Glickman | G06F 16/35 |
| | | | 707/602 |
| 2003/0139921 A1* | 7/2003 | Byrd | G06F 40/289 |
| | | | 704/10 |
| 2004/0088653 A1* | 5/2004 | Bell | G06F 16/972 |
| | | | 715/249 |
| 2006/0253418 A1* | 11/2006 | Charnock | G06F 16/34 |
| 2006/0287989 A1* | 12/2006 | Glance | G06F 16/951 |
| 2007/0038499 A1* | 2/2007 | Margulies | G06Q 10/06316 |
| | | | 705/7.26 |
| 2008/0016087 A1* | 1/2008 | Zhang | G06F 16/951 |
| 2009/0019010 A1* | 1/2009 | Takeya | G06F 16/313 |
| 2009/0132906 A1* | 5/2009 | Aoki | G06F 40/14 |
| | | | 715/234 |
| 2011/0289106 A1* | 11/2011 | Rankin, Jr. | G06F 16/284 |
| | | | 707/769 |
| 2016/0335356 A1* | 11/2016 | Desineni | G06F 3/04847 |
| 2018/0150926 A1* | 5/2018 | Darden | G06Q 30/0278 |

* cited by examiner

*Primary Examiner* — Michael Roswell
(74) *Attorney, Agent, or Firm* — Ferguson Braswell Fraser Kubasta PC

(57) ABSTRACT

One or more embodiments provide for a method. The method includes receiving a document including text. The method also includes receiving different definitions of a position in the document of an identifier-value pair within the text. The identifier-value pair includes an identifier identifying an information type in the text and a value including an entry of the information in the text. The method also includes determining which of the different definitions correctly point to the position to form a number of correct definitions. Each of the different definitions correctly points to the position when the identifier-value pair is found on a first attempt using a definition of the different definitions to search for the identifier-value pair. The method also includes, responsive to the number of correct definitions at least matching a threshold value, issuing a command to perform data scraping on the document to extract the value of the identifier.

16 Claims, 7 Drawing Sheets

```
id="BillingInfo_rgBillingInfo_ctl00_ctl06_Detail10"
style="border-width:1px;border-style:solid;width:100%;table-layout:auto;empty-cells:show;">
<colgroup>
<col>
<col>
<col>
</colgroup>
<thead>
<tr>
<th class="rgHeader" scope="col">Date Payment Received</th><th class="rgHeader" scope="col">Amount Paid</th><th
class="rgHeader" scope="col">Payment Method</th>
</tr>
</thead><tbody>
<tr class="rgRow" id="BillingInfo_rgBillingInfo_ctl00_ctl06_Detail10__0:0_0">
<td>06/22/2018</td><td>$666.62</td><td>EFT</td>
</tr><tr class="rgAltRow" id="BillingInfo_rgBillingInfo_ctl00_ctl06_Detail10__0:0_1" style="background-color:#EAFAFF;">
<td>05/22/2018</td><td>$206.24</td><td>EFT</td>
</tr>
</tbody>

</table></td>
</tr>
</tbody>

</table><tr>

<td colspan="4">
<strong>For additional information about your Payment History, please contact Service Point at 666-666-6666.</strong>
</td>

</div><input name="BillingInfo_rgBillingInfo_ClientState" id="BillingInfo_rgBillingInfo_ClientState" type="hidden"></div>
</td>
```

HTML Pseudo-code 600
- 602: header row (Date Payment Received, Amount Paid, Payment Method)
- 604: first data row
- 606: second data row

AUTOMATED DATA SCRAPING

BACKGROUND

Data scraping is a computerized technique in which a computer program extracts data from human-readable output coming from another program. For example, a program may output information on a screen to be read by a user, such as to view a spreadsheet of information on a web browser. Data scraping may involve extracting data from the image presented on the screen, or from hypertext markup language (HTML) data used to command a computer to render the screen. Data scraping may be performed on different documents, including portable document format (PDF) documents, extensible markup language (XML) documents, or many other types of documents. The extracted data can then be translated into a format more useful to the computer for further automated processing.

SUMMARY

One or more embodiments provide for a method. The method includes receiving a document including text. The method also includes receiving different definitions of a position in the document of an identifier-value pair within the text. The identifier-value pair includes an identifier identifying an information type in the text and a value including an entry of the information in the text. The method also includes determining which of the different definitions correctly point to the position to form a number of correct definitions. Each of the different definitions correctly points to the position when the identifier-value pair is found on a first attempt using a definition of the different definitions to search for the identifier-value pair. The method also includes, responsive to the number of correct definitions at least matching a threshold value, issuing a command to perform data scraping on the document to extract the value of the identifier.

One or more embodiments provide for a system including a storage device storing a document including text having an identifier-value pair within the text. The identifier-value pair is at a position within the document. The system also includes an evaluation engine configured to: receive the document and receive a different definitions of the position within the document of the identifier-value pair. The evaluation engine is also configured to determine which of the different definitions correctly point to the position to form a number of correct definitions. Each of the different definitions correctly points to the position when the identifier-value pair is found on a first attempt using a definition of the different definitions to search for the identifier-value pair. The system also includes a scraping engine for performing data scraping on the document by extracting a value of the identifier-value pair and storing the value on the storage device.

One or more embodiments provide for a system including a client computer. The client computer includes an evaluation engine configured to receive a hypertext transfer protocol (HTML) web page from a host computer. The HTML web page includes text including an identifier-value pair having a position within the web page. The evaluation engine is also configured to receive a different definitions of the position of the identifier-value pair in the HTML web page. The evaluation engine is also configured to determine which of the different definitions correctly point to the position to form a number of correct definitions. Each of the different definitions correctly points to the position when the client computer, using the definition to search for the identifier-value pair in the HTML web page, finds the identifier-value pair on a first attempt. The evaluation engine is also configured to evaluate whether the number of correct definitions at least matches a threshold value. The client computer also includes a scraping engine configured, responsive to the number of correct definitions at least matching the threshold value, to perform data scraping on the document by extracting a value of the identifier-value pair and storing the value on a storage device.

Other aspects of the invention will be apparent from the following description and the appended claims.

BRIEF DESCRIPTION OF DRAWINGS

FIG. 5, FIG. 6A, and FIG. 6B show an example in accordance with one or more embodiments.

DETAILED DESCRIPTION

Figure 1:
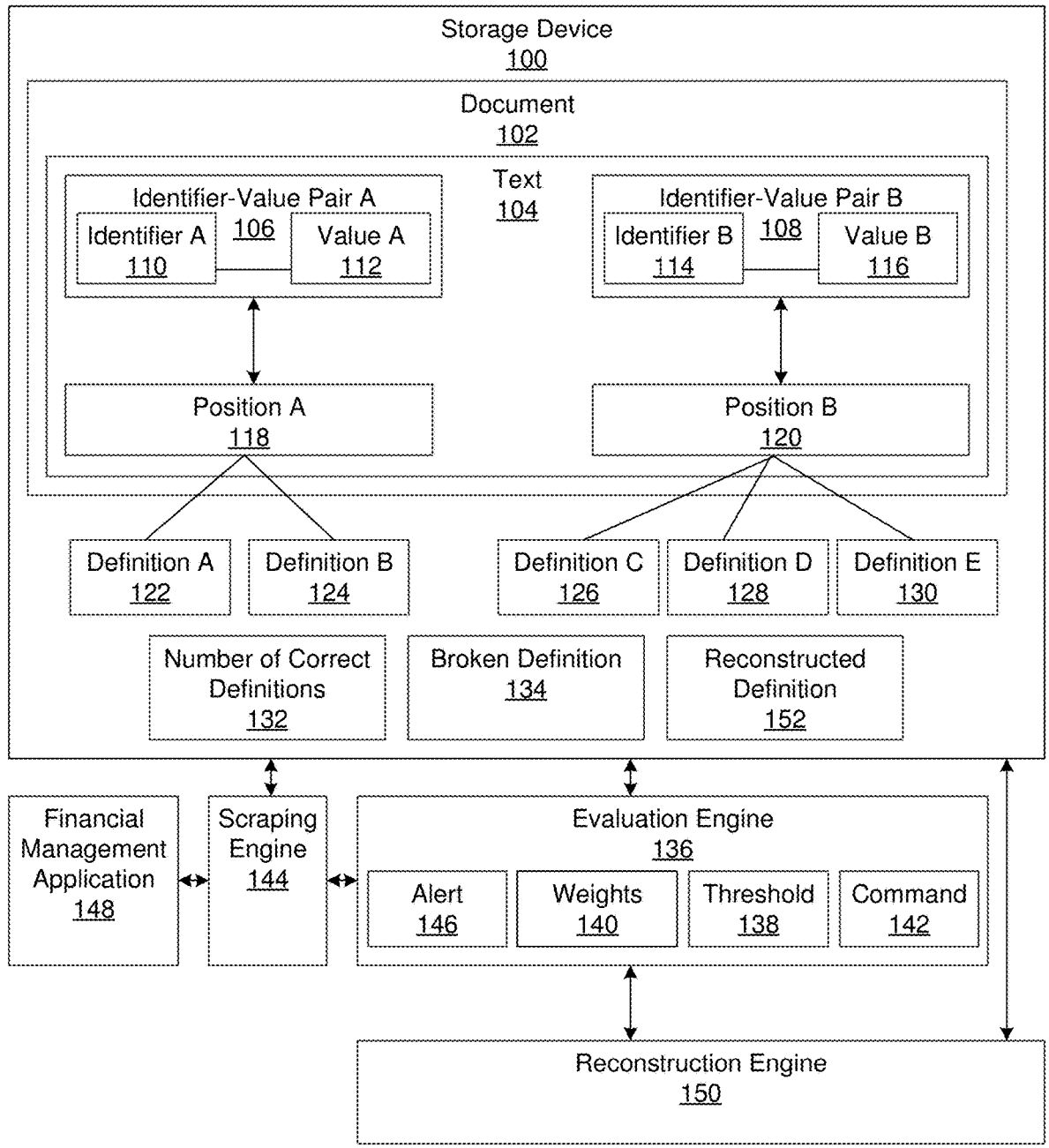
FIG. 1 and FIG. 2 show schematic system diagrams in accordance with one or more embodiments.

Specific embodiments will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

Further, although the description includes a discussion of various embodiments of the invention, the various disclosed embodiments may be combined in virtually any manner. All combinations are contemplated herein.

In general, embodiments of the invention are directed to methods for performing data scraping. As mentioned, data scraping is a computerized technique in which a computer program extracts data from human-readable output coming from another program. As background and as used herein, the terms "document" or "documents" refer to "human-readable output coming from another program."

Sometimes it is desirable to perform data scraping on many documents, possibly tens of millions of documents that all have a common format. Typically, the documents are published on the Internet by an entity other than the company or computer that performs the data scraping. Such documents are thus subject to change without warning to the company or computer that performs the data scraping. In fact, changes to documents are commonly deemed inevitable, and sometimes frequent. The nature of each change can vary dramatically, reflecting changes in the type of information displayed, where the information is displayed, how the information is displayed, and a nearly infinite combination of different ways of presenting the same or similar information. Because changes are typically propagated to all future presentations of the document type, changes to the code required to perform data scraping are tracked and implemented by the company or computer performing the data scraping.

One technological issue that occurs when performing data scraping on documents is broken definitions. A definition is code or text which defines the position of an identifier-value pair of text displayed on a screen. The identifier identifies the type of information. The value is an entry of that type of information. Thus, an "identifier-value pair" is a combination of an identifier and a value that uniquely identifies a portion of text displayed on a screen or to be displayed on a screen. As an example, an identifier-value pair in a document could refer to an entry of "$5" in a column labeled "credits." The identifier is "credits," the value is "$5," and the two pieces of data are considered an "identifier-value pair." The position of the identifier-value pair is the location of the data on the screen. Continuing the example, the "position" of the $5 entry is "Position X, Position Y" on an X-Y axis used to locate where the $5 entry is located in the document. Typically, especially in hypertext markup language (HTML) documents, a great many ways of defining the position of an identifier-value pair exist.

As suggested above, the issue is compounded by the presence of broken definitions of identifier-value pairs caused by changes to documents. A definition is "correct" if the computer can use the definition to find the desired identifier-value pair on a first attempt. A definition is "broken" if the definition is not correct. The number of broken definitions can be unacceptably high, as understood by the ordinary artisan. "Unacceptably high" means that there are a sufficient number of broken definitions that the ordinary artisan cannot use the scraped data for its intended purpose, meaning that as little as one broken definition could be "unacceptably high" in some cases (though in some other cases, "unacceptably high" could be many broken definitions). Generally, at least one correct definition must be present for data scraping to retrieve the desired data; however, in some cases only one correct definition (or only a few correct definitions) is not acceptable as the data scraping may not be considered reliable for an intended purpose.

In the case of HTML web pages, changes in HTML pages usually affect only some definitions. For instance, changing the style of the page breaks many of the definitions that rely on the class of tags, but text-based definitions persist. Likewise, a change in the wording might break the text-based definitions, but not the style-class based definitions. Thus, it may remain true that a document having some broken definitions could still be data scraped without having to reconstruct definitions or generate new definitions. Avoiding reconstruction of definitions may be preferable to avoid unnecessary work, though of course reconstruction of definitions may be performed, as described further below.

One or more embodiments described herein address this technological issue that arises only in computers and computer networks. In particular, one or more embodiments present techniques for instructing a computer how to determine when performing data scraping is acceptable on a document. In addition, one or more embodiments present techniques for instructing a computer how to reconstruct broken definitions, and then perform data scraping.

Attention is now turned to the figures. FIG. 1 is a system for performing data scraping on documents, such as document (102) present in storage device (100). The storage device (100) may be any type of device or devices with functionality to allow access and retrieval of data as a persistent storage device(s) or a non-persistent storage device(s) in the manner shown and described in FIG. 7A.

As shown in FIG. 1, the document (102) contains text (104). In one or more embodiments, the text (104) includes one or more identifier-value pairs, such as identifier-value pair A (106) and identifier-value pair B (108). Identifier-value pair A (106) includes identifier A (110) and value A (112). Identifier-value pair B (108) includes identifier B (114) and value B (116). Each identifier-value pair includes a position within the document (102). Thus, identifier-value pair A (106) has position A (118) within the document (102), and identifier-value pair B (108) has position B (120) within the document (102).

Each position has one or more definitions which define where a position is located within the document (102). A position is defined, in the case of a HTML document, using HTML code (see the method shown and described in relation to FIG. 3 for additional techniques for defining a position within HTML code). However, a position can be defined by a two (or more) dimensional coordinate system, by pixels rendered on a screen, or by any convenient method for identifying a position of an identifier-value pair on a computer-displayable document, such as document (102).

In this particular example shown in FIG. 1, position A (118) is associated with two definitions: definition A (122) and definition B (124). Each of the two definitions refers to the same identifier-value pair: identifier-value pair A (106). In turn, position B (120) is associated with three definitions: definition C (126), definition D (128), and definition E (130). Each of the three definitions refers to the same identifier-value pair: identifier-value pair B (108).

The document (102) contains a number of correct definitions (132). Again, a definition is "correct" if the computer can use the definition to find the desired identifier-value pair on a first attempt; whereas a definition is "broken" if the definition is not correct. In this example shown in FIG. 1, the document (102) includes a broken definition (134), as defined and discussed above.

In one or more embodiments, an evaluation engine (136) is a computer program executable on a computer to evaluate some or all of the definitions in document (102); in this example shown in FIG. 1, all of definition A (122), definition B (124), definition C (126), definition D (128), and definition E (130). The evaluation engine (136) is configured to determine the number of correct definitions (132) and which definition is the broken definition (134).

The evaluation engine (136) is also configured to compare the number of correct definitions (132) to a threshold (138), which may be referred-to as a "first threshold" or simply as a "threshold value" in some cases. The threshold (138) is a pre-determined number that represents how many broken definitions a user is willing to tolerate before data scraping can be performed. The threshold (138) may be determined using different techniques. In one or more embodiments, the threshold may simply be a percentage (e.g., 50%) of broken definitions to working definitions, with the percentage selected by a user. The percentage may be any number, from even one broken definition from among all possible definitions (a low percentage), to all definitions (i.e., 100%). In one or more embodiments, a weight may be assigned to each path (i.e., a definition) based on attributes of the path. For example, each path may be evaluated quantitively according to uniqueness relative to other paths, complexity relative to other paths, or tenure relative to other paths. The weight influences how strongly a given path influences the threshold. Stated differently, a weighted majority (typically from 50% to 100%) determines the threshold. In one or more embodiments, the threshold may be set depending on the importance of the data being scraped. In other words, if the data is considered very important, then a lower threshold is set (meaning that fewer broken definitions are tolerated).

The evaluation engine (136) is also configured to include weights (140). The weights (140) are numbers that represent a greater or lesser value of definitions when determining whether the threshold (138) of the number of correct definitions (132) has been met. The weights (140) may be associated with any of definition A (122), definition B (124), definition C (126), definition D (128), and definition E (130). The weights may be selected arbitrarily. Alternatively, the weights may be assigned based on the distance a path is from other paths. The term "distance" may be defined in a variety of ways, though in one or more embodiments may be the Jaccard index of the operations and operands in each path, compared to other paths. Paths more distant relative to each other should receive higher weights because they are more likely to be unique definitions. Such paths may receive a weight of 1, whereas paths that are closely related to each other may receive a weight of less than 1.

The evaluation engine is also configured to issue a command (142) in response to the evaluation. The command (142) may be a command to perform data scraping on the document (102) if the evaluation is that the number of correct definitions (132) matches or exceeds the threshold (138). Alternatively, the command may be not to perform data scraping on document (102) or to stop data scraping in progress, if the evaluation is that the number of correct definitions (132) is less than the threshold (138).

The evaluation engine is also configured to issue an alert (146) as a notification given to a user that the document (102) may need to be evaluated manually. Manual evaluation may determine the correct definitions of the positions of the identifier-value pairs within the document (102).

The output of the scraping engine (144) is scraped data. The scraped data may be provided to other software components for further processing. In this example, in accordance with one or more embodiments of the invention, the scraped data is financial data that is provided to a financial management application (FMA) (148). The FMA (148) then processes the financial data according to its own programming.

The FMA (148), in accordance with one or more embodiments, is a software application written in any programming language. In one or more embodiments, the FMA (148) is capable of assisting a user with the user's finances. For example, the FMA may be a tax program, a personal budgeting program, a small business financial program, or any other type of program that assists with finances. The FMA (148) contains a user interface that allows for the user to interact with the FMA (148).

In one or more embodiments, a reconstruction engine (150) is programmed to reconstruct broken definitions, such as broken definition (134). The reconstruction engine (150) is programmed to find the relevant identifier-value pair, and then calculate a correct definition that correctly points to the identifier-value pair. The correct definition is the reconstructed definition (152).

Figure 2:
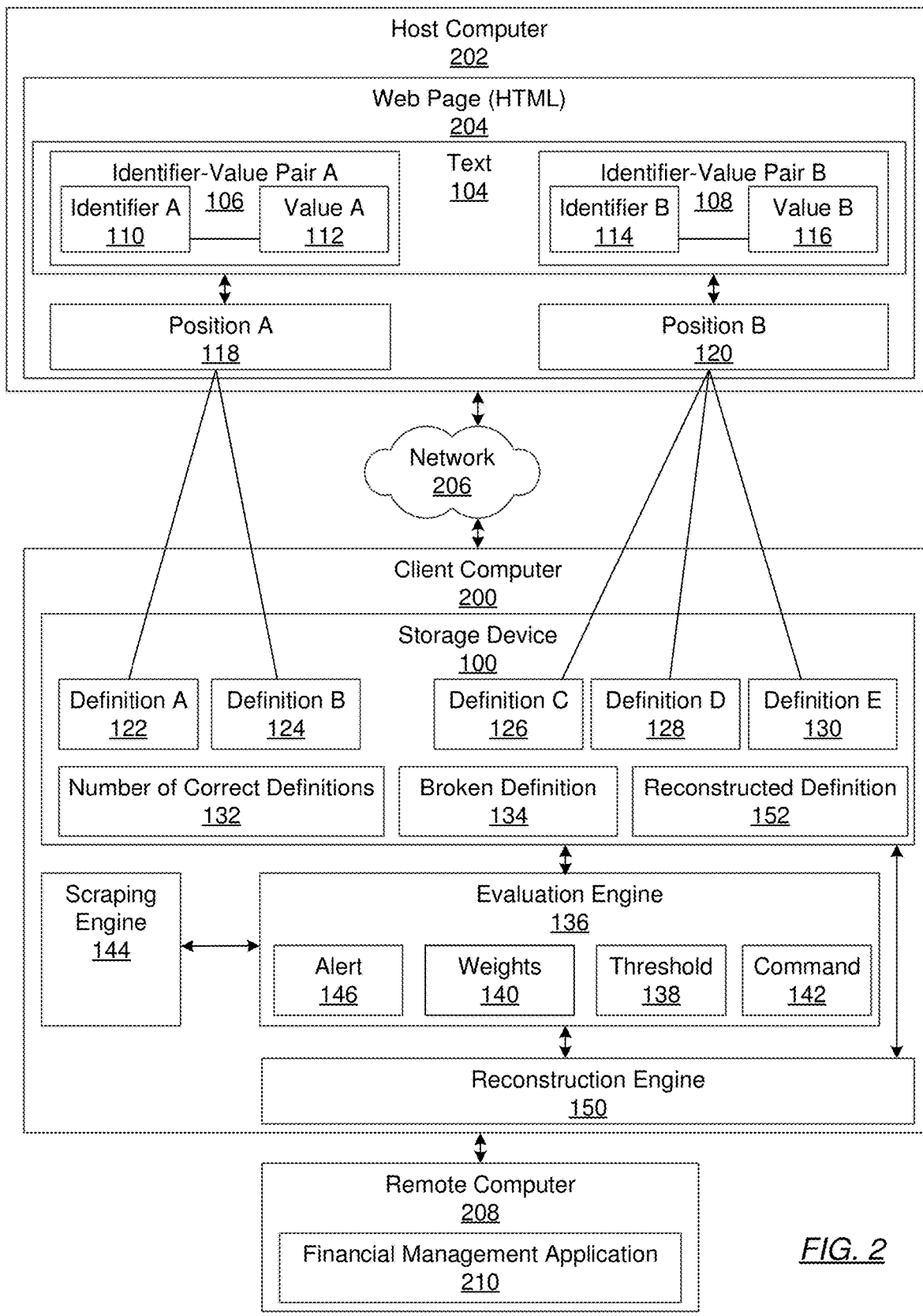

Attention is now turned to FIG. 2. The system of FIG. 2 represents a variation of the embodiment of the system shown in FIG. 1. In this particular embodiment, the system of FIG. 2 is a networked environment in which a client computer (200) contains the evaluation and scraping software components, and in which the target of evaluation and scraping is a web page (204) hosted by the host computer (202). Thus, document (102) of FIG. 1 corresponds with the web page (204) of FIG. 2, which in this example is a web page in the form of an HTML document. In one or more embodiments, the client computer (200) communicates with host computer (202) via network (206), and vice versa.

As shown by FIG. 2, another difference with the system of FIG. 1 is that the financial management application (210) executes on remote computer (208) (rather than externally in a cloud environment or as a software as a service) in accordance with one or more embodiments. The financial management application (210) is substantially the same as the financial management application (148) shown and described in relation to FIG. 1. The remote computer (208) is remote from both the client computer (200) and the host computer (202). In one or more embodiments, the remote computer (208) is a user device with the functionality to execute the financial management application (210) and provide the user of the financial management application (210) the necessary access to the client computer and host computer, either directly or through a network connection, such as network (206). Similarly, the host computer (202) is remote from both the client computer (200) and the remote computer (208). In this manner, the client computer (200) may perform the data scraping and definition evaluation described with respect to FIG. 3 and FIG. 4 using the components described in FIG. 1 on a web page hosted by some third party, and the scraped data then provided to the remote computer (208).

In other respects, the components shown in the system of FIG. 2 correspond to commonly numbered components shown in the system of FIG. 1. Thus, reference numerals common to both figures refer to the same components and have essentially the same purpose and functionality described and shown in FIG. 1.

Figure 3:
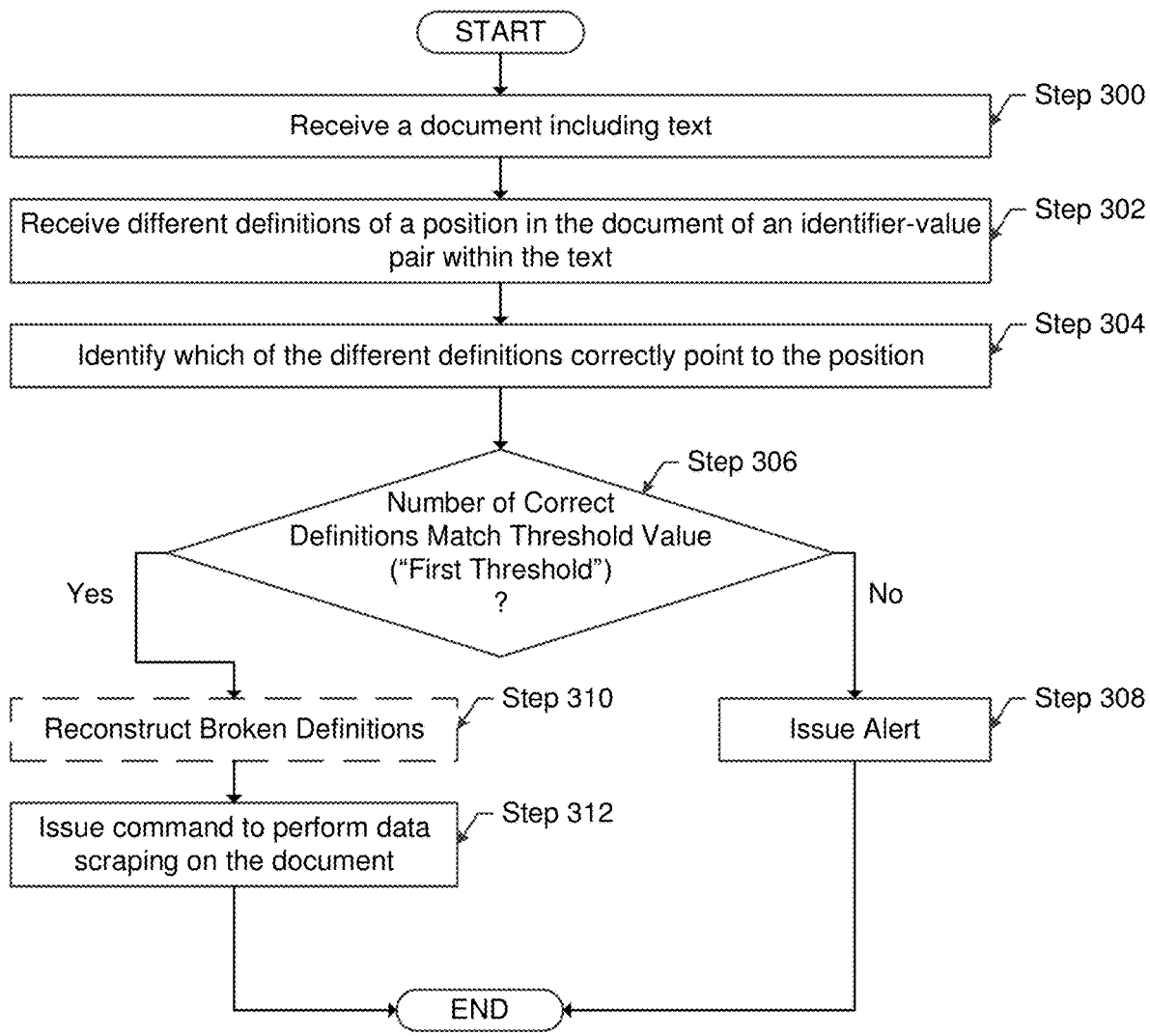
FIG. 3 and FIG. 4 show flowchart diagrams in accordance with one or more embodiments.

FIG. 3 shows a flowchart of performing data scraping on a document. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 300, a document including text is received in accordance with one or more embodiments. The document may be received in a variety of manners and from a variety of sources, including one or more websites for companies or other entities of interest, such as financial institutions. The text within the document may be of any type, but is commonly HTML pages using HTML tags, textual markers, colors, fonts, etc.

In one or more embodiments, different definitions are received, where the definitions are of a position in the document of an identifier-value pair within the text (Step 302). The identifier-value pair is an identifier identifying an information type in the text and a value including an entry of the information in the text in accordance with one or more embodiments. An information "type" is a category of information for which one or more entries exist. An "entry" is an instance of the type.

In the case of an HTML document, multiple ways (i.e. 'paths') in the document object model (DOM) of an HTML document exist to define the position of an identifier-value pair. For example, one could define the position relative to other elements, in absolute terms, using HTML tags, textual markers, colors, fonts, and so on, and any combination of this partial list of anchors. The identifier-value pair: ["payment amount"/$345] in a billing HTML page may be defined, for example, in the following ways:

Definition 1. The text "payment amount" with <font-size 12> left aligned anywhere in the visible page.

Definition 2. The text "payment amount" in a <div> with class "class-payment-record" inside a <div> with both the class "class-main-display" and "class-customer-view".

Definition 3. The text "payment amount" after the text "account number" and before the text "total sum" anywhere in the code.

Definition 4. A line-break, text containing the word "amount", then a ":" sign, a $ sign, and a number.

Many other examples for defining the position of an identifier-value pair within an HTML document exist. Of particular interest is that many such definitions may exist for each identifier-value pair. The possible existence of many definitions for the same identifier-value pair allows for a determination whether any given document is ready for data scraping. The term "ready" is defined as meeting the threshold in Step 306, but more generally can be thought of as an evaluation that data scraping is able to correctly retrieve the desired data from the target document.

Identification is made regarding which of the different definitions correctly points to the position (Step 304). Each of the different definitions is identified as correctly pointing to the position when the identifier-value pair is found on a first attempt using a definition to search for the identifier-value pair.

Next, a determination is made whether the number of correct definitions matches a threshold value (Step 306), which may be referred to as the "first" threshold. As defined above, the threshold value is a pre-determined number that represents how many broken definitions a user is willing to tolerate before data scraping can be performed.

If "no", then in Step 308 an alert is issued. The method of FIG. 3 may terminate thereafter. The alert may take the form of an automatically generated email, pop-up window, text, phone call, or any convenient means for communicating to a programmer or other technician that data scraping has been terminated or otherwise will not be initiated. In this manner, the programmer or technician may be advised that a manual review the document and a manual identification of definitions may be desirable. Alternatively, the alert may constitute an automatic instruction to a computer or a software process to generate, automatically, new definitions according to the method shown in FIG. 4.

If "yes" at step 308, then a command is issued to perform data scraping on the document, in order to extract the value of the identifier (Step 312). The method of FIG. 3 may terminate thereafter. In the HTML documents, scraping may take the form of approaching each identifier-value pair using all of the multiple paths defined by each definition for a given identifier-value pair. Data scraping may also be performed by optical character recognition on images. Data scraping may also be performed by directly retrieving data from tables or other data structures.

Attention is now turned to alternative embodiments and alternative descriptions for the above embodiments. As indicated above, scraping of personal financial data may include extracting pre-defined data fields from websites displaying the personal financial data. The majority of data used for some financial management applications may come from data scraping of HTML pages. These HTML pages and their structure vary among the providers of the HTML pages (such as financial institutions), may vary among different users, and may evolve over time, causing scraping scripts to break often, or retrieve the wrong data.

Routine (usually minor) changes in HTML pages usually affect only some of these paths, letting the remaining valid paths keep track on the identifier-value pair, and allowing the few "broken" paths to reconstruct themselves. For instance, changing the style of the page may break many of the paths that rely on the class of tags, but text-based paths persist. Likewise, a change in the wording might break the text-based paths but not the style-class based ones.

Thus, one or more embodiments define multiple DOM paths to a data item to be retrieved, so that in the event of changes in the underlying web page, although some of these paths may be broken, some still point to the right location allowing (a) continuation with data extraction, (b) issuance of a warning, and (c) automatic repair of the set of paths by adding new relevant paths and discarding the broken ones. Thus, unlike traditional scrapers, one or more embodiments provide a dynamic system that learns to adapt to a changing environment, making sure that data is collected correctly and continuously.

In this manner, one or more embodiments provide for at least three new capabilities relative to prior data scraping techniques. First, the one or more embodiments provide a redundancy by design to enhance data quality. The redundancy results from multiple definitions all pointing to the same data item to be scraped. Each of many data items may have multiple definitions. Second, one or more embodiments provide for a weighted majority vote as a tool for robust data scraping. The weighted majority vote takes the form of determining whether the number of correct definitions match the threshold value, as indicated by step 306. Third, one or more embodiments provide for the ability to reconstruct broken definitions. Reconstructing broken definitions is described further below, with respect to FIG. 4.

The method of FIG. 3 may be varied, including more or varied steps. For example, in addition to the alert issued at Step 308, any existing data scraping operations may be terminated. In another example, identifying at Step 304 may include weighting some of the multitude of different definitions according to different weights as part of identifying which of the different definitions correctly point to the position. Weighting itself may include repetitively performing identification over a period of time, and assigning greater weights to definitions that most often appear in a majority class among a first class involving definitions that at least match the threshold value and a second class involving definitions that fail to match the threshold value.

In another variation, responsive to the number of correct definitions being less than all of the multitude of different definitions, but still at least matching the threshold value ("Yes" at Step 306), the method of FIG. 3 may include, when needed, automatically reconstructing a broken definition that fails to correctly point to the position (Step 310). Reconstructing may be performed using a reconstruction engine, such as reconstruction engine (150) of FIG. 1, so that a reconstructed definition correctly points to the position. The method shown in FIG. 4 may be used to reconstruct broken definitions.

In yet another variation, one or more embodiments automatically reconstruct receiving documents similar to an ordinary document. In this example, all of the multitude of documents include a corresponding similar identifier-value pair at a corresponding similar position. For each of the multitude of documents, a list of potential definitions is built that define the corresponding position of the corresponding similar identifier-value pair. The potential definitions are scored, according to a simplicity of definition and a diversity relative to others of the potential definitions, to generate multiple scores for a corresponding set of reconstructed definitions. Responsive to a score for a potential definition exceeding a threshold value, the potential definition is added to a list of accepted definitions. Responsive to another number of accepted definitions exceeding another threshold value, the list of accepted definitions is used for future steps of determining which of the multitude of different definitions correctly point to the position of the identifier-value pair.

Scoring the potential definitions may be performed using a genetic algorithm, in which case the method may further include generating more trees in the genetic algorithm by mutating and crossing already existing trees. In another variation, building the list of potential definitions may include using operands and operators within the multitude of documents to generate the potential definitions.

Furthermore, the document may be a hypertext transfer protocol (HTTP) document. In this case, the operands include at least one of document object model (DOM) objects, attributes of the DOM objects, and textual anchors. The operators include at least one of relations between the DOM objects and a Boolean operator.

In still another variation, the document may be a financial document. In this case, the value may be financial information contained within the document. Data scraping then includes extracting the financial information and inputting the financial information into a financial management application for further processing.

Other variations are possible. Thus, the examples provided with respect to FIG. 3 do not necessarily limit the claimed inventions or the other examples provided herein.

Figure 4:
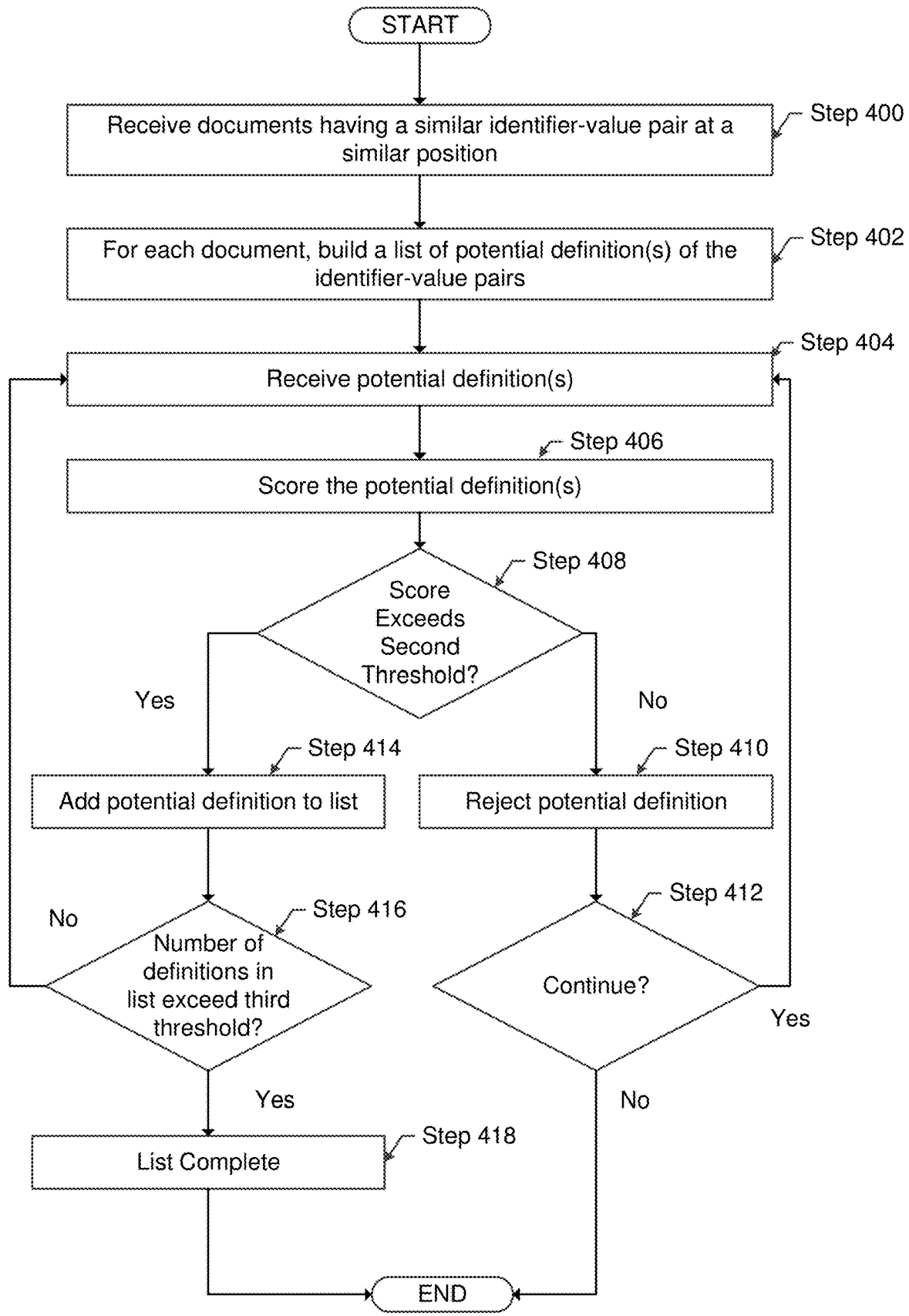

Attention is now turned to FIG. 4. In one or more embodiments, FIG. 4 shows a method of building a list of definitions of positions of identifier-value pairs within the text of a document. The method of FIG. 4 may be performed prior to the method shown in FIG. 3, and may be executed by the systems shown in FIG. 1 or FIG. 2, and/or the computer system shown in FIG. 7A-7B.

Documents having a similar identifier-value pair at a similar position are received (Step 400). The documents may be received over a network from a data repository containing many such documents, such as storage device (100) of FIG. 1 or may be received by scanning web sites of interest, such as the web page (204) of FIG. 2. The documents are typically received by a screen scraping software program, which may be the evaluation engine (136) of FIG. 1 and FIG. 2. The format of the documents is typically HTML or similar text, but could be images if optical character recognition is used, or a combination of both. In other words, documents of a similar type are received. Optionally, or perhaps in addition, prior to receiving the documents, a test document similar to the document is received.

A list of potential definitions of the identifier-value pair is built for each document (Step 402). Potential definitions may be built according to the method shown in FIG. 4. As an alternative, in the case of HTML documents, the definitions may be identified in the documents themselves, or may be in a list of pre-defined definitions for a given document or document type. Potential definitions may be built using a software or hardware process, such as evaluation engine (136) of FIG. 1 or FIG. 2. In step 404, a potential definition is received from the process building or otherwise retrieving the potential definitions at step 402. The potential definition may also be found in the list of potential definitions.

Potential definitions of the identifier-value pairs may also be built in the following manner. Based on the configuration related to a specific domain (e.g. insurance, bills) the system suggests identifier-value pairs (e.g. 'date due': 12/2/18). The domain expert (which may be a human or some form of artificial intelligence) accepts or edits the suggestions until satisfied. A machine learning algorithm automatically then finds multiple paths to reach each identifier-value pair defined by the domain expert (see FIG. 4). For example, a genetic algorithm may be used to randomly invert paths. The inverted paths may be improved using operations such as mutation, cross-over, and copy. The genetic algorithm prefers better paths. In this framework, a path may be defined using expression trees.

In Step 406, the potential definitions are scored. As an example, genetic algorithm framework may be used to score paths by validity and size, and to generate expression trees by mutating and crossing already existing expression trees. As used herein, expression trees are sets of definitions which relate to a given identifier-value pair, in which an operator within the definition serves as a node from which may depend other operators or operands. Paths that are simple, sound, and add to the diversity of the set of paths receive higher scores and produce similar offspring. In an embodiment, an expression tree score may be a function of the number of nodes, coverage, and distance from other trees. For example, an expression tree score may be determined by the following expression: 0.5*1/[average Jaccard Index of this path compared to all others+eps]+0.5*1/[number of operations with the path]. In this equation, the term "eps" refers to the Greek letter "epsilon", and is a pre-determined small number to prevent the equation from including an operation in which a term is divided by zero. The result of scoring is to generate a multitude of scores for a corresponding set of constructed or reconstructed definitions.

In Step 408, a determination is made whether the score exceeds a second threshold. The term "second" threshold is used to distinguish the threshold used here from the threshold of the number of correct definitions that must be present for data scraping to be performed, as described with respect to Step 306 of method of FIG. 3. If a score for a corresponding potential definition exceeds the second threshold value ("yes" to Step 408, then in Step 414, the potential definition is added to a list of accepted definitions. Otherwise, ("No" to Step 408, in Step 410, the potential definition is rejected.

The consequence of accepting a definition and adding it to the list is that the accepted definition becomes one of possibly multiple definitions for a given identifier-value pair. The consequence of rejecting a potential definition is that the definition will not be used to define a given identifier-value pair.

Returning to step 414, after adding the potential definition to the list, in step 416, a determination is made whether the number of definitions in the list exceed a third threshold. The term "third threshold" is used to distinguish from the other two thresholds mentioned in FIG. 3 and FIG. 4, above. The third threshold is a number pre-determined by a programmer.

If "No", then the method returns to Step 404 and repeats. If "Yes", then in Step 418, the list is considered complete. The completed list may then be used in the process for determining which of the different definitions correctly points to the position of the identifier-value pair in step (304) of FIG. 3. The method of FIG. 6 may terminate thereafter.

Returning to Step 410, after rejecting the potential definition, a determination is made whether to continue the process (Step 412), such as when more potential definitions are to be evaluated. If "Yes", then the method returns to Step 404 and repeats. Otherwise, if "No", then the method of FIG. 4 may terminate thereafter. The process of evaluating potential definitions may terminate when the number of definitions for an identifier-value pair is considered sufficient, or if no more available ways exist to establish a definition for an identifier-value pair. In this context "sufficient" is determined by a programmer, a pre-determined number of definitions, or some other method.

Attention is now turned to additional details regarding the reconstruction of broken definitions. One or more embodiments provide for automatically reconstruction of the paths that are not aligned with the majority class, using the 'finding multiple paths algorithm' described here. For a given small set of randomly selected users of a given provider (for example subscribers to a financial institution): i) accumulate relevant HTML pages with the fields of interest (for example, the bill report page), preferably diverse across different users and time; ii) for each page, build a list of potential paths (list size is configurable, but it should be at least 1,000 items) using operands and operators.

Operands include DOM objects (e.g. a <table> tag, a text field) and/or their attributes (e.g. id/class/name/font size/color/type) and textual anchors (e.g. "total sum"). Operators include the relations between operands (e.g. comes between, adjacent to its right, within 50-60 characters to its left), as well as "AND" or "OR" operations defined with HTML code.

Multiple standard ways exist to generate these paths. One way is building expression trees in a recursive way where operators serve as nodes.

Returning to the "finding multiple paths algorithm", in a third step, a genetic algorithm framework is used to score the paths by their validity and size and generate more trees by mutating and crossing already existing ones. In this evolutionary process, paths that are simple, sound, and add to the diversity of the set of paths get higher scores, and produce similar, preferably better, offspring. Thus, the expression tree score may be defined as: f(number of nodes, coverage, distance from other trees). In a fourth step, when a set of paths with a score exceeding a predefined threshold is reached, then the paths are published (considered complete). The published (complete) paths may then be used as the new (i.e., constructed or reconstructed) definitions of the identifier-value pairs in the process of determining whether data scraping should be performed on a document or a class of documents.

Figures 5, 6A:
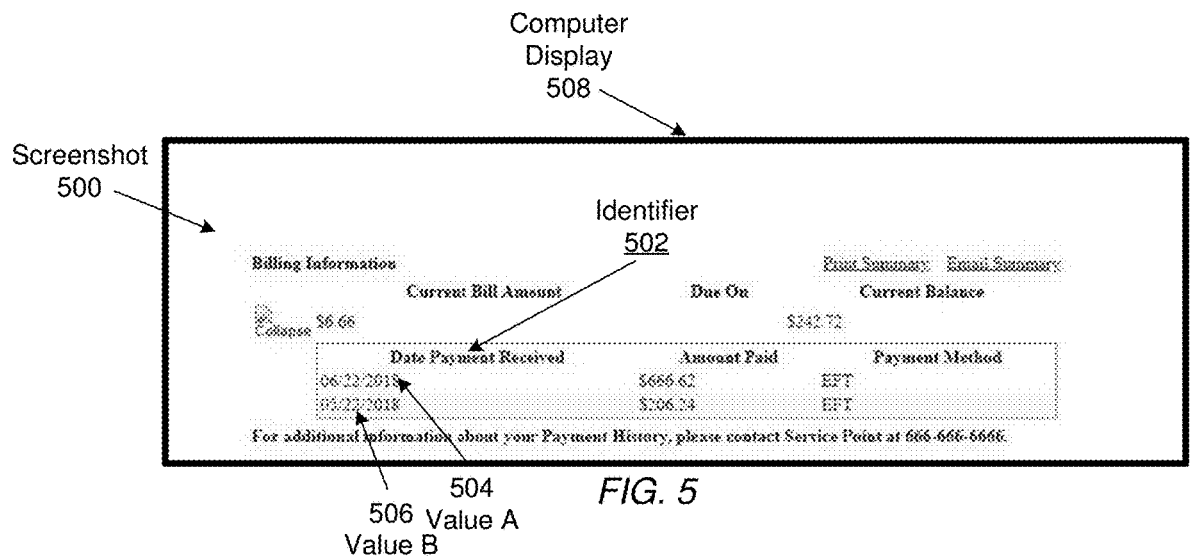

FIG. 5, FIG. 6A, and FIG. 6B show a specific use case for the one or more embodiments. This use case is only an example, and thus should not necessarily be construed to limit either the claimed inventions or other variations described herein.

Turning first to FIG. 5, screenshot (500) is an example of an HTML web page being displayed on a computer display (508). Thus, screenshot (500) may be what a user sees when web page (204) of FIG. 2 or document (102) of FIG. 1 are rendered and displayed on a computer display. In this example, screenshot (500) is of billing records indicating payments made to the user's bank account.

Several types of information are shown including "date payment received", "amount paid" and "payment method." Each of these indicators is an example of an "identifier", as described above with respect to FIG. 1 through FIG. 4. For purposes of illustration, identifier (502) refers to the "Date Payment Received". Thus, entries under the identifier (502) are considered "values". Accordingly, the text "06/22/2018" is value A (504), which is one of two values shown that correspond to identifier (502). The other value shown is value B (506), corresponding to the text "05/22/2018". In this example, the identifier (502) and the value A (504) form a first identifier-value pair. The identifier (502) and the value B (506) form a second identifier-value pair.

Attention is now turned to showing a definition of the identifier-value pair corresponding to the identifier (502) and the value A (504). In this specific example, the definition is established using HTML code, for which HTML pseudo-code (600) is provided in FIG. 6A and FIG. 6B.

The definition for the identifier (502) is established by the HTML code shown generally at bracket (602) in FIG. 6B. The definition for the value A (504) is established by the HTML code shown generally at bracket (604) in FIG. 6B. The definition for the value B (506) is established by the HTML code shown generally at bracket (606) in FIG. 6B. Together, these lines of code provide two definitions: the definition of the identifier-value pair corresponding to the identifier (502) and the value A (504), as well as the identifier-value pair corresponding to the identifier (502) and the value B (506), as shown in FIG. 5.

These two definitions of two different identifier-value pairs are then evaluated using an evaluation engine such as evaluation engine (136) of FIG. 1. If both identifier-value pairs are correct, then data scraping is performed on the document shown in screenshot (500) of FIG. 5. The values, value A (504) and value B (506), are extracted using data scraping techniques, and then provided to a financial management application for further processing.

Alternatively, if the identifier-value pairs are determined to be broken, then data scraping may be prevented or terminated. At that point, a reconstruction engine can be used to build new definitions automatically. The new definitions are then used to automatically re-evaluate the document shown in the screenshot (500) and re-initiate automated data scraping.

Attention is now turned to a more technical description of the pseudo-code shown in FIG. 6A and FIG. 6B. As indicated above, the identifier-value pair of interest is "Date Payment Received" (identifier (502)) and "6/22/18" (value A (504). After reviewing fifty similar HTML pages where these two fields were paired together by an expert, the following three expressions were made. Each expression is a definition of an identifier-value pair.

Definition 1. Key match scope="col">Date Payment Received</th> AND Value after BillingInfo_rgBillingInfo AND Value format DATE AND Value before </td><td>$.

Definition 2. Key match Payment Received</th> AND Value after Key AND Value format DATE AND Value before ">(new line)<td> AND Value contains 2018

Definition 3. Key between sharp brackets AND key contains (pay, rec, date) AND Key after </colgroup>(new line)<thead> AND Value within 100 character after key AND value in the same line with rgHeader AND Value is DATE In addition to these definitions, there are other good ways of anchoring the identifier-value pair. Three ways are used in this example, but in a real implementation, the number might be ten or more.

The expressions above may be represented in expression trees because of the ability of expression trees to mutate easily without breaking grammar. The definitions defined above have a combined and personal high score. Each definition (expression tree) is scored for low number of nodes, high coverage, and distance from the other trees. Therefore, each tree effects the score of others.

Definition number 2 has a weakness that can be easily avoided in a real application, and thus serves only as an example. Definition number 2 uses the year 2018 as an anchor. When year 2019 arrives, definition number 2 fails. However, the system keeps working because there is a majority of 2 to 1 in favor of the definition set. However, a warning is sent, and a new replacer is set (i.e., the broken definition is reconstructed).

Definition number 2 can be replaced as follows by having the value matching the first instance of Date Payment Received AND Value is after Key AND Value is DATE AND. The value near AMOUNT is selected to replace definition number 2. The new rule is robust since it is short, it matches all examples given, and it adds to the overall diversity of the set of rules since it also uses different operations and operators than the others (near, AMOUNT).

The one or more embodiments described above have been shown using documents written in HTML code. However, one or more embodiments may have broader applicability. For example, an optical character recognition (OCR) process may be applied to images and portable document format (PDF) documents in order to identify text. Definitions for identifier-value pairs within such documents may then be identified and evaluated to determine when data scraping is appropriate on such documents. Broken definitions may be similarly reconstructed using the techniques described herein.

Similarly, one or more embodiments may be expanded to the analysis of social networks. In social networks, entities have connections to each other, which may have identifier-value pairs which can be evaluated, scraped, and constructed. Additionally, the edges and vertices of paths in the social networks may be used to detect entities and thus identifier-value pairs. Thus, one or more embodiments may be used for data scraping of social networks. Likewise, one or more embodiments may be used to scrape and maintain tree database structures by evaluating relationships and connections within the tree database. In one or more embodiments a malicious user deliberately breaking features in documents to avoid detection may be tracked. By detecting patterns in broken definitions, and perhaps through the use of machine learning analyzing those patterns, a malicious user can be identified, tracked, and/or blocked.

Figure 7A:
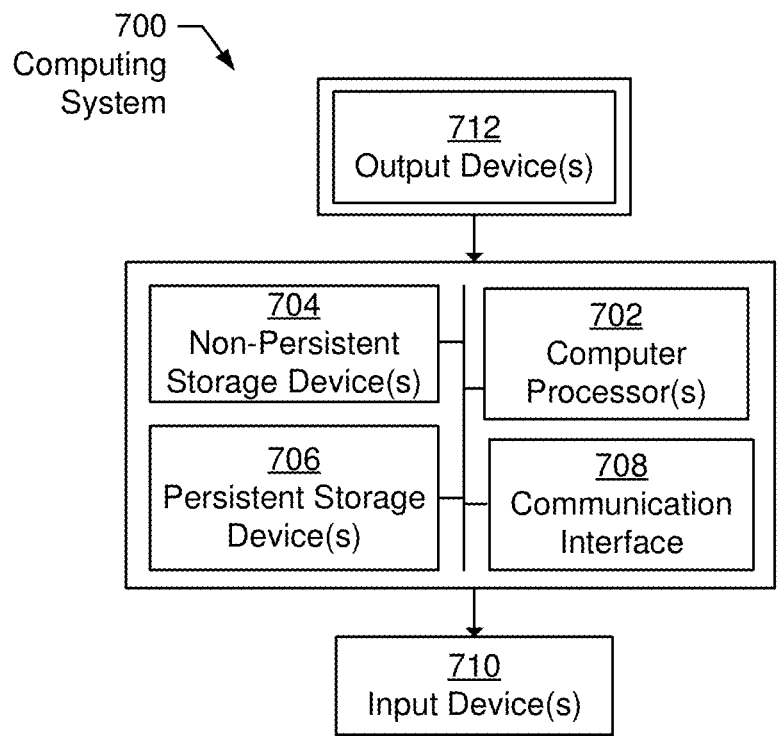
FIG. 7A and FIG. 7B show flow diagrams of a computing system, in accordance with one or more embodiments.

Embodiments of the invention may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 7B:
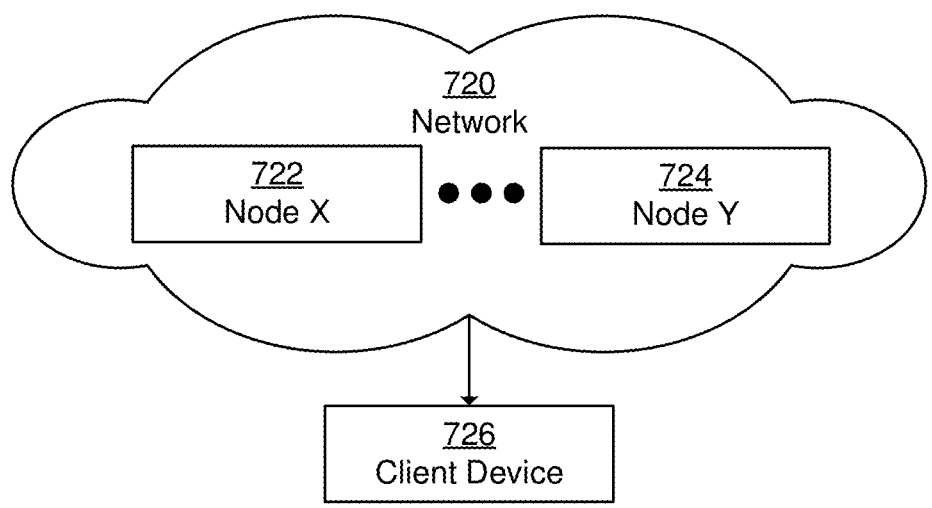

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the invention.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7A and the nodes and/or client device in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving, by a computer automatically, a document comprising text;
receiving, by a computer automatically, a plurality of different definitions of a position in the document of an identifier-value pair within the text, wherein the identifier-value pair comprises an identifier identifying an information type in the text and a value comprising an entry of the information type in the text;

determining, by a computer automatically, which of the plurality of different definitions correctly point to the position to form a number of correct definitions, wherein each of the plurality of different definitions correctly points to the position when the identifier-value pair is found on a first attempt using a definition of the plurality of different definitions to search for the identifier-value pair;

responsive to the number of correct definitions at least matching a threshold value, issuing, by a computer automatically, a command to perform data scraping on the document to extract the value of the identifier; and responsive to the number of correct definitions being less than all of the plurality of different definitions, but still at least matching the threshold value, automatically reconstructing a broken definition that fails to correctly point to the position using a reconstruction engine so that a reconstructed definition correctly points to the position, wherein automatically reconstructing comprises using a computer to perform operations comprising:

receiving a plurality of documents similar to the document, all of the plurality of documents comprising a corresponding similar identifier-value pair at a corresponding similar position, wherein similar comprises being within a specified numerical threshold;

for each of the plurality of documents, building a list of potential definitions that define a corresponding position of the corresponding similar identifier-value pair;

scoring the potential definitions, according to a simplicity of definition and a diversity relative to others of the potential definitions, to generate a plurality of scores for a corresponding set of reconstructed definitions;

responsive to a score for a potential definition exceeding a second threshold value, adding the potential definition to a list of accepted definitions; and responsive to a second number of accepted definitions exceeding a third threshold value, using the list of accepted definitions for future steps of determining which of the plurality of different definitions correctly point to the position of the identifier-value pair.

2. The method of claim 1, further comprising:
responsive to the number of correct definitions being less than the threshold value, issuing an alert and terminating any data scraping on the document.

3. The method of claim 1, wherein determining further comprises:
weighting some of the plurality of different definitions according to different weights as part of determining which of the plurality of different definitions correctly point to the position.

4. The method of claim 3, wherein weighting comprises:
repetitively performing determining over a period of time; and
assigning greater weights to definitions that most often appear in a majority class among a first class comprising definitions that at least match the threshold value and a second class comprising definitions that fail to match the threshold value.

5. The method of claim 1, wherein scoring the potential definitions is performed using a genetic algorithm, and wherein the method further comprises:
generating more trees in the genetic algorithm by mutating and crossing already existing trees.

6. The method of claim 1, wherein building the list of potential definitions comprises:
using operands and operators within the plurality of documents to generate the potential definitions.

7. The method of claim 6, wherein the document comprises a hypertext transfer protocol (HTTP) document, and wherein:
the operands comprise:
at least one of document object model (DOM) objects, attributes of the DOM objects, and textual anchors; and
the operators comprise:
at least one of relations between the DOM objects and a Boolean operator.

8. A method comprising:
receiving, by a computer automatically, a test document similar to a document comprising text, wherein similar comprises being within a specified numerical threshold;

receiving, by a computer automatically, an identifier-value pair for the test document, wherein the identifier-value pair comprises an identifier identifying an information type in the text and a value comprising an entry of the information type in the text;

receiving, by a computer automatically, the document comprising text;

automatically creating, by a computer, a plurality of different definitions of a position in the document of an identifier-value pair within the text;

determining, by a computer automatically, which of the plurality of different definitions correctly point to the position to form a number of correct definitions, wherein each of the plurality of different definitions correctly points to the position when the identifier-value pair is found on a first attempt using a definition of the plurality of different definitions to search for the identifier-value pair;

responsive to the number of correct definitions at least matching a threshold value, issuing, by a computer automatically, a command to perform data scraping on the document to extract the value of the identifier;

building, by a computer automatically, a list of potential definitions that define the position of the identifier-value pair;

scoring, by a computer automatically, the potential definitions, according to a simplicity of definition and a diversity relative to others of the potential definitions, to generate a plurality of scores for a corresponding set of reconstructed definitions;

responsive to a score for a corresponding potential definition exceeding a second threshold value, adding, by a computer automatically, the potential definition to a list of accepted definitions; and responsive to a second number of accepted definitions exceeding a third threshold value, using, by a computer automatically, the list of accepted definitions for determining which of the plurality of different definitions correctly point to the position of the identifier-value pair.

9. The method of claim 8, wherein scoring the potential definitions is performed using a genetic algorithm, and wherein the method further comprises:
generating more trees in the genetic algorithm by mutating and crossing already existing trees.

10. The method of claim 8, wherein the document comprises a hypertext transfer protocol (HTTP) web page, and wherein building the list of potential definitions further comprises:

using operands and operators within a plurality of documents to generate the potential definitions, wherein the operands comprise at least one of document object model (DOM) objects, attributes of the DOM objects, and textual anchors; and wherein the operators comprise at least one of relations between the DOM objects and a Boolean operator.

11. The method of claim 8, wherein the document comprises a hypertext transfer protocol (HTTP) web page containing financial information arranged by categories of information, wherein a category of the categories comprises the identifier of the identifier-value pair, and wherein an entry within the category comprises the value of the identifier-value pair.

12. The method of claim 8, wherein:

the document comprises a financial document;

the value comprises financial information contained within the document; and data scraping comprises extracting the financial information and inputting the financial information into a financial management application for further processing.

13. A system comprising:

a storage device storing a document comprising text comprising an identifier-value pair within the text, wherein the identifier-value pair is at a position within the document;

an evaluation engine executable by a computer, the evaluation engine configured to:

receive the document;

receive a plurality of different definitions of the position within the document of the identifier-value pair; and determine which of the plurality of different definitions correctly point to the position to form a number of correct definitions, wherein each of the plurality of different definitions correctly points to the position when the identifier-value pair is found on a first attempt using a definition of the plurality of different definitions to search for the identifier-value pair;

a scraping engine, executable by the computer, for performing data scraping on the document by extracting a value of the identifier-value pair and storing the value on the storage device; and a reconstruction engine, executable by the computer, the reconstruction engine configured to:

responsive to the number of correct definitions being less than all of the plurality of different definitions, but still at least matching a threshold value, automatically reconstruct a broken definition that fails to correctly point to the position using a reconstruction engine so that a reconstructed definition correctly points to the position, wherein automatically reconstructing comprises:

receiving a plurality of documents similar to the document, all of the plurality of documents comprising a corresponding similar identifier-value pair at a corresponding similar position, wherein similar comprises being within a specified numerical threshold;

for each of the plurality of documents, building a list of potential definitions that define a corresponding position of the corresponding similar identifier-value pair;

scoring the potential definitions, according to a simplicity of definition and a diversity relative to others of the potential definitions, to generate a plurality of scores for a corresponding set of reconstructed definitions;

responsive to a score for a potential definition exceeding a second threshold value, adding the potential definition to a list of accepted definitions; and responsive to a second number of accepted definitions exceeding a third threshold value, using the list of accepted definitions for future steps of determining which of the plurality of different definitions correctly point to the position of the identifier-value pair.

14. The system of claim 13, wherein the evaluation engine is further configured to use the reconstructed definition for further comparisons of each of the plurality of different definitions to the position when determining whether each of the plurality of different definitions correctly points to the position.

15. The system of claim 13, wherein the evaluation engine is further configured to, responsive to determining that the threshold is not met, issue a command to the scraping engine to terminate data scraping and issue an alert.

16. The system of claim 13, further comprising:

a financial management application configured to manage finances of a user; and wherein:

the document comprises a financial document;

the value comprises financial information contained within the document; and the scraping engine is configured to extract the financial information and input the financial information into the financial management application for further processing.

\* \* \* \* \*